(12) United States Patent
Paparella et al.

(10) Patent No.: US 7,836,358 B2
(45) Date of Patent: Nov. 16, 2010

(54) METHOD AND NETWORK ELEMENT FOR IMPROVING ERROR MANAGEMENT IN MANAGED NETWORKS, AND COMPUTER PROGRAM PRODUCT THEREFOR

(75) Inventors: Andrea Paparella, Busto Arsizio (IT); Pasquale Donadio, Naples (IT); Roberto Riglietti, Vimereate (IT)

(73) Assignee: Alcatel Lucent, Paris (FR)

( * ) Notice: Subject to any disclaimer, the term of this patent is extended or adjusted under 35 U.S.C. 154(b) by 545 days.

(21) Appl. No.: 11/768,672

(22) Filed: Jun. 26, 2007

(65) Prior Publication Data
US 2008/0126835 A1    May 29, 2008

(30) Foreign Application Priority Data
Jun. 27, 2006    (EP)    ................... 06291071

(51) Int. Cl.
*G06F 11/00* (2006.01)
*G06F 11/30* (2006.01)
(52) U.S. Cl. ................. 714/48; 714/4; 714/43
(58) Field of Classification Search ........... 714/4, 714/43, 48
See application file for complete search history.

(56) References Cited

U.S. PATENT DOCUMENTS

| | | | | |
|---|---|---|---|---|
| 5,471,399 A | * | 11/1995 | Tanaka et al. | 716/11 |
| 5,594,861 A | * | 1/1997 | Jonsson et al. | 714/2 |
| 6,067,634 A | * | 5/2000 | Nelson | 714/4 |
| 6,122,664 A | * | 9/2000 | Boukobza et al. | 709/224 |
| 6,381,712 B1 | * | 4/2002 | Nemitz | 714/57 |
| 7,051,244 B2 | * | 5/2006 | Fisher et al. | 714/48 |
| 7,082,553 B1 | * | 7/2006 | Wang | 714/38 |
| 7,275,094 B1 | * | 9/2007 | McCloghrie et al. | 709/223 |
| 7,698,691 B2 | * | 4/2010 | Chen et al. | 717/129 |
| 2002/0007468 A1 | * | 1/2002 | Kampe et al. | 714/4 |
| 2004/0025086 A1 | * | 2/2004 | Gorday et al. | 714/37 |
| 2004/0049572 A1 | * | 3/2004 | Yamamoto et al. | 709/224 |
| 2004/0163016 A1 | * | 8/2004 | Kim | 714/47 |
| 2005/0276385 A1 | * | 12/2005 | McCormick et al. | 379/1.02 |
| 2007/0250603 A1 | * | 10/2007 | Suen | 709/220 |

FOREIGN PATENT DOCUMENTS

EP    1102433 A2    5/2001

OTHER PUBLICATIONS

R. Preshun, et al.: "Version 2 of the Protocol Operations for the Simple Network Management Protocol," IETF, Dec. 2002, Geneve, Switzerland, XP002403035.

* cited by examiner

*Primary Examiner*—Scott T Baderman
*Assistant Examiner*—Joseph Schell
(74) *Attorney, Agent, or Firm*—Carmen Patti Law Group, LLC

(57) ABSTRACT

A method for identifying an error cause affecting the configuration of a network element controlled by a network manager is described. The method includes the step of transmitting from the network element to the network manager a message including a first field for indicating if a configuration error occurs in the network element. The message further includes a second field for indicating the configuration error cause, wherein the configuration error cause is dynamically selected out from a configuration information stored into the network element.

10 Claims, 2 Drawing Sheets

METHOD AND NETWORK ELEMENT FOR IMPROVING ERROR MANAGEMENT IN MANAGED NETWORKS, AND COMPUTER PROGRAM PRODUCT THEREFOR

FIELD OF THE INVENTION

The invention relates to a technique for identifying an error cause affecting the configuration of a network element controlled by a network manager in a managed network. The present invention was developed by paying specific attention to the possible use in Simple Network Management Protocol (SNMP)-managed network.

This application is based on and claims the benefit of European patent application no. 06291071.6 filed on Jun. 27, 2006, which is incorporated by reference herein.

BACKGROUND OF THE INVENTION

The Simple Network Management Protocol (SNMP) is an application-layer protocol designed to facilitate the exchange of management information between network devices. By using the SNMP-transported data (such as packets per second and network error rates), the network administrators can more easily manage the network performance, find and solve network problems, and plan network expansion.

Like the Transmission Control Protocol (TCP), the Simple Network Management Protocol (SNMP) is an Internet protocol.

Today, the SNMP is the most popular protocol for managing different commercial inter-networks as well as those used in Universities and Research Organizations.

The SNMP protocol is part of the Internet network management architecture. This architecture is based on the interaction of entities, as described in the following.

As specified in the Internet Request For Comments (RFCs), a network management system comprises:

Network Elements: sometimes called Managed Devices, which are hardware devices such as computers, routers and access servers, terminal servers, switches and bridges, hubs, computer hosts, or printers, connected to managed networks. The Network Elements collect and store management information and make this information available to the Network Management Station (NMSs) using the SNMP protocol;

Agents: the Agents are network-management software modules that reside in the Network Elements. The Agents collect and store management information such as the number of error packets received by a network element. An Agent has local knowledge of management information and is configured to translate that management information into a form that is compatible with the SNMP protocol;

Managed Object: a Managed Object is a characteristic of something that can be managed. For example, a list of currently active Transmission Control Protocol (TCP) circuits in a particular host computer is a Managed Object. The Managed Objects differ from variables, which are particular object instances; for example, an object instance is a single active TCP circuit in a particular host computer;

Management Information Base (MIB): a MIB is a collection of hierarchically organized information. A MIB is a collection of Managed Objects residing in a virtual information store; the collections of related Managed Objects are defined in specific MIB modules. The Management Information Bases are accessed by using a network management protocol, such as e.g. the SNMP protocol;

Network Management Station (NMSs): sometimes called consoles, these devices execute management applications that monitor and control Network Elements. At least one NMS must be present in each managed environment. The network management station can be a workstation or a personal computer; and Management Protocol: a Management Protocol is used to convey management information between Agents and Network Management stations.

An Object Identifier (or object ID) uniquely identifies a Managed Object in the Management Information Base hierarchy. The MIB hierarchy can be depicted as a tree with a nameless root, the leaves of which are assigned by different organizations.

The top-level MIB object Identifiers belong to different standards organizations, while the lower-level object Identifiers are allocated by associated organizations.

The Network Management station manages the devices and provides a summary of the information learned, or reports locally stored management information.

In recent years, most network elements have been using a network management protocol based, e.g., on a Simple Network Management Protocol (SNMP), to manage network and monitor operations of respective network devices. The SNMP protocol is the most typical network management protocol, through which an SNMP manager and an SNMP agent can exchange data.

With reference to FIG. 1, a Network Management station 100 comprises a User Interface 102 and a Network Management Application 104. The Network Management station 100 manages three network elements 110, each of which comprises an Agent module 112 and a Managed Information Base (MIB) 114. The Network Management station 100 and the Agent modules 112 are able to exchange data message.

In particular, the standard error management of the SNMP protocol, version v1/v2/v3, is not enough powerful for most cases. In fact, the SNMP standard errors are related to the SNMP management only (see Table 1), and no mention is done to the device causes of the error. Table 1 refers to some standard SNMP Error Status Codes known in the art.

All constraints remarked in the MIB descriptions cannot be mapped or referred to in the error status.

However, the Network Management (TMN) applications must help the user for managing the errors and guiding the user through the troubles. Additional benefits are to reduce the Operating Expenditure (OPEX) and to support powerful tools for managing errors.

TABLE 1

| Error status | Code |
| --- | --- |
| No_Error | 0 |
| Too_Big | 1 |
| No_Such_Name | 2 |
| Bad_Value | 3 |
| Read_Only | 4 |
| Gen_Err | 5 |
| No_Access | 6 |
| Wrong_Type | 7 |
| Wrong_Length | 8 |
| Wrong_Encoding | 9 |
| Wrong_Value | 10 |
| No_Creation | 11 |
| Inconsistent_Value | 12 |
| Resource_Unvailable | 13 |
| Commit_Failed | 14 |
| Undo_Failed | 15 |
| Authorization_Error | 16 |
| Not_Writable | 17 |
| Inconsistent_Name | 18 |

To solve this problem, the SNMP error management can be improved by including the error cause into the SNMP response message.

Some of the SNMP error codes cannot happen in a system where manager and agent are built based on the same model, e.g., the "Bad Type" error.

Usually, both manager and agent should know that an attribute "A" is of type "T". The fact that the manager sends a wrong type is not a transient run-time condition, but it is an indication of incompatibility, e.g., a wrong version was installed. These error codes are useful to detect an installation/version selection problem, but after the problem is fixed, they will not happen any more. Another example is the "Wrong Length" error related to the length of octet strings.

Standard SNMP error codes are generic, protocol-oriented error codes. They mean things like "line already exists", "read only", "generic error", "bad value". It is difficult to say much more precise about the error happened. Sometimes errors are generated by the agent framework, based on some preliminary checks (maybe read-only permission and similar ones), possibly even without involving application code.

Besides the standard error codes (from 1 to 18—see Table 1), the SNMP protocol supports user-defined error codes. Theoretically a proprietary value is sent in the error field, but look out that doing so might compromise the interoperability with generic SNMP browsers, which do not expect proprietary values (unless properly configured to handle & recognize them), and this might not be acceptable for certain Network Elements/customers.

What the Manager can do is to isolate the context of the provisioning, and mapping the specific error-cause into "generic" error-code. The Manager uses this mapping (context specific) to display the associated probable cause description.

The "generic" error-codes that the Manager/Agent can reuse in different context are only three: "genErr", "badValue", "InconsistentValue", but they are not sufficient to isolate each error causes we need to refer to.

SUMMARY OF THE INVENTION

The foregoing description of the prior art demonstrates that the need exists of defining solutions capable of identifying an error cause affecting the configuration of a Network Element controlled by a network manager in a managed network.

The object of the invention is thus to provide a fully satisfactory response to this need.

According to the present invention, that object is achieved by means of a method having the features set forth in the claims that follow. The invention also relates to a corresponding network element, and a related computer program product, loadable in the memory of at least one computer and including software code portions for performing the steps of the method of the invention when the product is run on a computer. The software code can be written in a programming language like "C". As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus a method for identifying an error cause affecting the configuration of a network element controlled by a network manager. The method includes the step of transmitting from the network element to the network manager a message including a first field for indicating if a configuration error occurs in the network element. The message further includes a second field for indicating the configuration error cause, wherein the configuration error cause is dynamically selected out from a configuration information stored into the network element.

The method can be advantageously implemented on a network element including hardware devices like an Application Specific Integrated Circuit (ASIC), Field Programmable Gate Array (FPGA), Electrically Programmable Logical Device (EPLD), microprocessor or memories.

A preferred embodiment of the network element comprises:

receiving means adapted to receive a message indicating a request for configuration of the network element;

means adapted to store information of the configuration;

means adapted to detect an error affecting the network element configuration;

transmitting means adapted to send a response message including a first field for indicating if the configuration error occurs.

The transmitting means are further adapted to send the response message including a second field for indicating a configuration error cause, wherein the configuration error cause is dynamically selected from the stored configuration information.

The solution described herein is based on a method for exchanging error information between an SNMP agent and an SNMP manager using the SNMP protocol in particular the SNMP versions v1/v2/v3, to be compliant with the SNMP standard.

SNMP response message includes the variable-bindings fields, which are not useful when an error occurs (i.e. when the error-status and error-index are non-zero). In the RFC3416 document (chapter 4.2.4. "The Response-PDU") is stated that: "If the error-status field of the Response-PDU is non-zero, the value fields of the variable bindings in the variable binding list are ignored. If both the error-status field and the error-index field of the Response-PDU are non-zero, then the value of the error-index field is the index of the variable binding (in the variable-binding list of the corresponding request) for which the request failed." The solution described herein suggests to fill the SNMP response with a new set of variable-bindings related to the error cause.

BRIEF DESCRIPTION OF THE DRAWINGS

The invention will now be described, by way of example only, with reference to the enclosed figures of drawing, wherein:

FIG. 2a shows an exemplary SNMP response message format structure in the prior art.

BEST MODE FOR CARRYING OUT THE INVENTION

Figure 1:
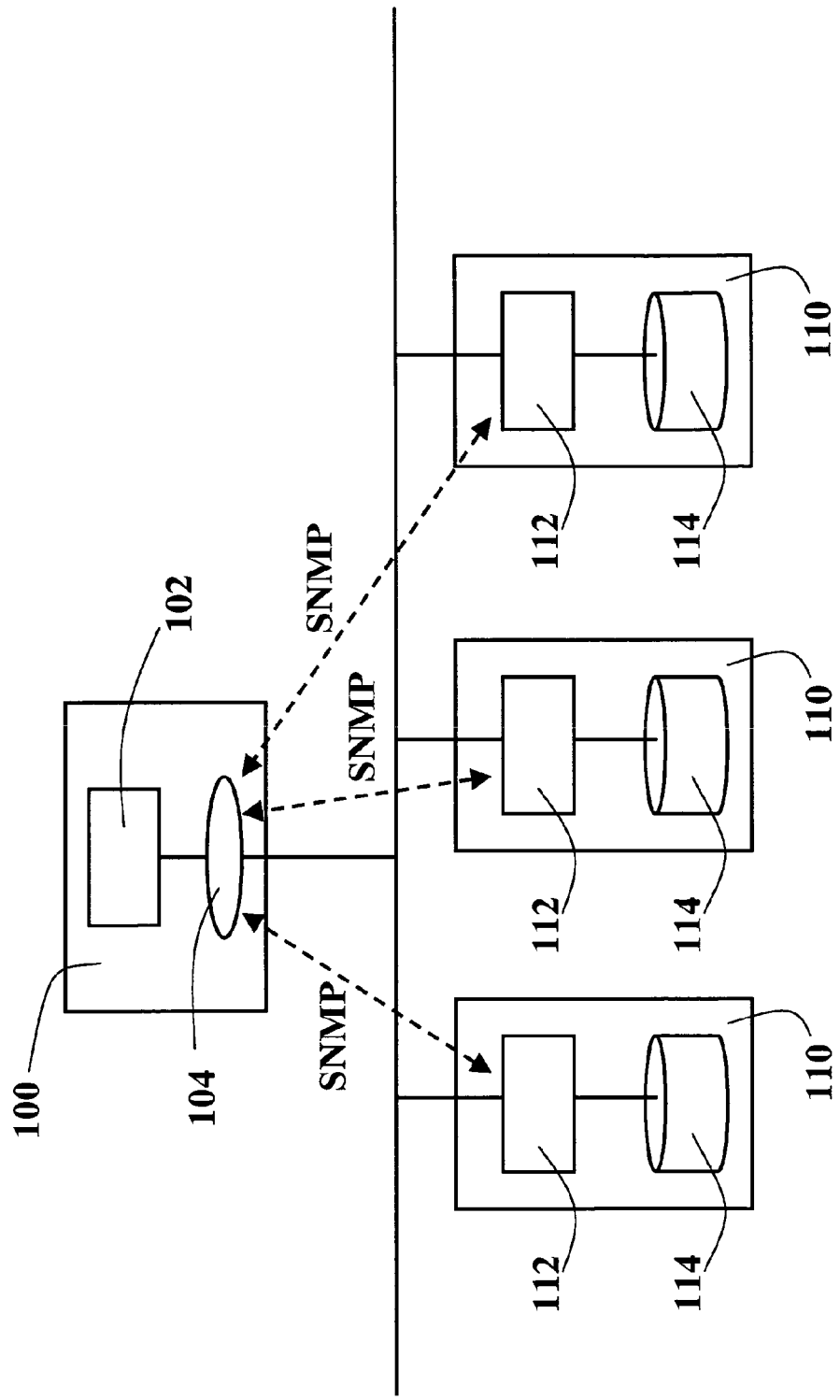
FIG. 1 shows an exemplary Internet management architecture.

In particular, with reference to FIG. 2a, an SNMP-response message 5 (Packet Data Unit-PDU) includes a PDU-Type field 10, a request-id field 20, an error-status field 30, an error-index field 40 and a variable-bindings field 50.

In the prior art when an error occurs the variable-bindings field 50 is ignored; this is shown in FIG. 2*a* with a cross in field 50.

Figure 2B:
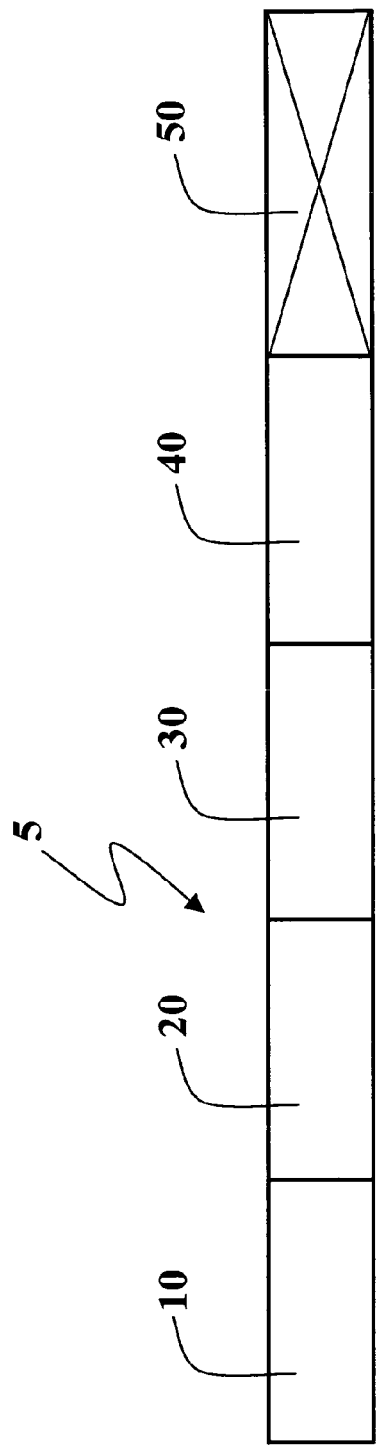
FIG. 2b shows the SNMP response message format structure according to the present invention.
Figure 2B:
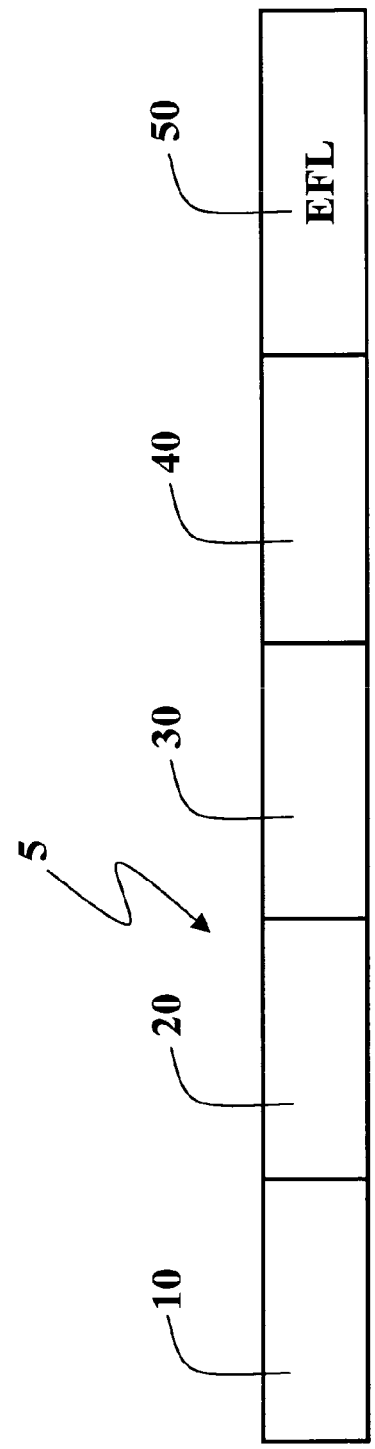

With specific reference to Table 1 and FIG. 2*b*, if one of these errors occurs—badValue(3), genErr(5), and inconsistentValue(12)—then the SNMP response message 5 will include an Extended Fault List (EFL) in the variable-bindings field 50, containing the following variable-bindings related to the error cause(s):

Error-code of Cause: the Manager is informed about the real hardware/software error cause. A simple solution is to inform the user by a textual message, which decodes the error-code. A complex solution is to drive the user by Troubleshooting wizard based, for example, on Bayesian Network (or Expert System); and Constrained Object list: the Manager is informed about the object instances, which are related to the error cause; they could be zero, one or more than one.

The EFL list is an "Agent oriented" error code list that increases the granularity of the error code, showing a structured set of details about the name and instance of objects involved with the raised error.

The EFL list is not a simple list of error codes binding, but can be dynamically generated or configured during the software Agent development phase.

In details, in an exemplary scenario described herein a MAU Ethernet Port #3, already used for port-to-port service, for test purpose is configured with the internal loop-back activated.

If the Manager set the "if AdminStatus#3" object instance to "down" then an "inconsistent value" error code is returned.

The SNMP-set request could be similar to the one shown in Table 2:

TABLE 2

| | |
|---|---|
| PDU-Type = | set(3) |
| Request-id = | hex 0034 (for example) |
| Error-status = | 0 |
| Error-index = | 0 |
| Variable-Binding1{OID1; Value1} = | {OpticsIMEthConfExtRemCsfMAU Action.3; disabled(0)} |
| Variable-Binding2{OID2; Value2} = | {IfAdminStatus.3; down(2)} |

The standard SNMP-response set could be similar to the one shown in Table 3:

TABLE 3

| | |
|---|---|
| PDU-Type = | response(2) |
| Request-id = | hex 0034 |

TABLE 3-continued

| | |
|---|---|
| Error-status = | inconsistentValue(18) |
| Error-index = | 2 |
| Variable-Binding1{OID1; Value1} = | {OpticsIMEthConfExtRemCsfMAU Action.3; disabled(0)} |
| Variable-Binding2{OID2; Value2} = | {IfAdminStatus.3; down(2)} |

The error-status (inconsistentValue) is not sufficient to discriminate the following causes, which could be shown to the user:

"The requested operation is traffic affecting. Please, remove any cross-connections on the Port #3", "Loopback is active. Please, remove the loopback on the Port #3", or Both the previous causes.

As a consequence, an extra-information (the EFL field) should be reported to the SNMP-Manager in order to discriminate the causes:

Error-code=opticsIMLastErrorStatus (scalar object) is 001,

Constrained Object=opticsIMEthConfInFlowNumber (Integer) related to Port#3,

Constrained Object=opticsIMEthConfOutFlowNumber (Integer) related to Port#3;

Error-code=opticsIMLastErrorStatus (scalar object) is 004,

Constrained Object=opticsIMEthConfExtlbLine (TruthValue) related to Port#3,

Constrained Object: opticsIMEthConfExtlbInternal (TruthValue) related to Port#3;

All the above set of objects.

Completing the example, referring to the third cause, the new SNMP-response will be composed by two parts: the standard SNMP response (rows 1-5) and the EFL list field (rows 6-11), as shown in Table 4:

TABLE 4

| | | |
|---|---|---|
| 1 | PDU-Type = | response(2) |
| 2 | Request-id = | hex 0034 |
| 3 | Error-status = | inconsistentValue(18) |
| 4 | Error-index = | 1 |
| 5 | Variable-Binding1{OID1; Value1} = | {IfAdminStatus.3; down(2)} |
| 6 | Variable-Binding2{OID2; Value2} = | {opticsIMLastErrorStatus.0; 001} |
| 7 | Variable-Binding3{OID3; Value3} = | {opticsIMEthConfInFlowNumber.3; 2} |
| 8 | Variable-Binding4{OID4; Value4} = | {opticsIMEthConfOutFlowNumber.3; 4} |
| 9 | Variable-Binding5{OID5; Value5} = | {opticsIMLastErrorStatus.0; 004} |
| 10 | Variable-Binding6{OID6; Value6} = | {opticsIMEthConfExtlbLine.3; True(1)} |
| 11 | Variable-Binding7{OID7; Value7} = | {opticsIMEthConfExtlbInternal.3; False(2)} |

The variable-binding of the set message which has generated the error (that is IfAdminStatus.3; down(2)) is moved to the first position. In this way, no impact is foreseen for the SNMP Management Information Base Browsers of the user.

The second benefit is to return the "final value" of the provisioning (for instance, it is very useful when the RowStatus is set).

To optimize the efficiency of "Troubleshooting Wizard" (as Manager Service), the SNMP-Agent should provide to the Manager more "meaningful" error-information as possible, i.e. fill the SNMP-PDU with a "dynamic" selection of "constrained objects" (the most useful), as a result of a Bayesian Network (or Expert System) procedure.

Each error-information is defined and stored in the Management Information Base (MIB).

The "Error-code" is an attribute of the SNMP-MIB (see opticsIMLastErrorStatus scalar object) storing the last error-code, which has been sent to the Manager. An Error-Log table is also defined for tracing the error messaging (see Table 5).

The advantages of the solution described herein are related to new support of error management and troubleshooting.

In particular, the "Extended Fault List" field (the SNMP-compliant list) is easily customizable for each Agent interested. The "Extended Fault List" field comprises two powerful elements:

an "error-cause" information that immediately informs the user about the probable cause of the arisen problem, and a "constrained object" list that can provide the support for the troubleshooting and therefore drives the user to perform the right operations.

Both of the mentioned features are not present in the prior art solutions.

TABLE 5

| SNMP Req-ID <index> | Time | Manager ID | Error Object OID | Error Object Value |
|---|---|---|---|---|
| hex 0034 | 25/01/06-10:22.34 | 1 | IfAdminStatus.3 | down(2) |
| hex 0121 | 25/01/06-23:11.00 | 4 | IfMauStatus.6 | operational(3) |

| SNMP Req-ID <index> | ErrLog ID <index> | Error-Code | Constrained Object OID | Constrained Object Value |
|---|---|---|---|---|
| hex 0034 | 0023 | 001 | opticsIMEthConfInFlowNumber.3 | 2 |
|  | 0024 | 001 | opticsIMEthConfOutFlowNumber.3 | 4 |
|  | 0025 | 004 | opticsIMEthConfExtlbLine.3 | True(1) |
|  | 0026 | 004 | opticsIMEthConfExtlbInternal.3 | True(1) |
| hex 0121 | 0027 | 013 | x.x.x | A |

The standard SNMP MIB-Browser (or third parties application) can continue to work in the normal way, because the solution is compliant to the SNMP standard.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method for identifying a configuration error cause for a configuration error that occurs during configuration of a network element controlled by a network manager, the method comprising:

transmitting from the network element to the network manager a message including a first field for indicating if the configuration error occurs in the network element, the message further including a second field for indicating the configuration error cause, wherein the configuration error cause is dynamically selected from configuration information stored into the network element, wherein the message is sent by the network element as a response to a configuration request by the network manager and wherein the second field includes an Extended Fault List including an Error-code and a Constrained Object list for indicating objects instances related to the error cause.

2. The method according to claim 1, wherein the Extended Fault List is dynamically generated or configured during a software Agent development phase.

3. The method according to claim 1, wherein the Extended Fault List further includes in a first position variable binding which has generated the configuration error.

4. The method according to claim 3, wherein a Management Information Base included in the network element stores the last Error-code which has been transmitted to the network manager.

5. The method according to claim 4, wherein the Management Information Base stores a table for tracing the error messages.

6. The method according to claim 1, wherein the Extended Fault List is customized for an Agent in the network element.

7. The method according to claim 1, wherein a Computer program product, loadable in the memory of at least one computer comprises software code portions for performing the method.

8. The method according to claim 1, wherein the network element is controlled by the network manager in a Simple Network Management Protocol (SNMP) managed network.

9. The method according to claim 1, wherein the Error-code field indicates a software or hardware error cause.

10. A network element comprising:

receiving means adapted to receive a message indicating a request for a configuration of the network element;

means adapted to store information of the configuration;

means adapted to detect an error affecting the network element configuration; and transmitting means adapted to send a response message including a first field for indicating if the configuration error occurs and including a second field for indicating a configuration error cause, wherein the configuration error cause is dynamically selected from the stored configuration information, wherein the message is sent by the network element as a response to a configuration request by a network manager, and wherein the second field includes an Extended Fault List including an Error-code and a Constrained Object list for indicating objects instances related to the error cause.

* * * * *